US012386098B2

(12) United States Patent
Fripp et al.

(10) Patent No.: US 12,386,098 B2
(45) Date of Patent: Aug. 12, 2025

(54) QUANTUM GRAVIMETERS FOR HYDROCARBON RESERVOIR ANALYSIS

(71) Applicant: Halliburton Energy Services, Inc., Houston, TX (US)

(72) Inventors: Michael Linley Fripp, Singapore (SG); Michael Christie, Aberdeenshire (GB); Luke William Holderman, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 476 days.

(21) Appl. No.: 17/704,858

(22) Filed: Mar. 25, 2022

(65) Prior Publication Data

US 2023/0305182 A1 Sep. 28, 2023

(51) Int. Cl.
*G01V 7/06* (2006.01)
*E21B 43/26* (2006.01)
*E21B 47/00* (2012.01)
*G01V 11/00* (2006.01)

(52) U.S. Cl.
CPC ............... *G01V 7/06* (2013.01); *E21B 43/26* (2013.01); *E21B 47/00* (2013.01); *G01V 11/002* (2013.01)

(58) Field of Classification Search
None
See application file for complete search history.

(56) References Cited

U.S. PATENT DOCUMENTS

| 4,457,077 | A | 7/1984 | Lautzenhiser |
| 8,438,917 | B2 | 5/2013 | Goldberg |
| 2008/0015803 | A1* | 1/2008 | Niebauer ............... G01V 13/00 73/382 R |
| 2013/0080064 | A1* | 3/2013 | Moldenhauer ........... G01V 7/06 702/11 |
| 2021/0010369 | A1* | 1/2021 | Lehr ..................... E21B 49/003 |
| 2021/0396134 | A1* | 12/2021 | Al Kawai .......... G01N 21/3563 |

OTHER PUBLICATIONS

Devani, D., "The Quantum World: From Laboratory to Industry," ARMMS 2019, 12 pages (Year: 2019).*
Devani, D., "The Quantum World: From Laboratory to Industry," ARMMS 2019, 12 pages.

* cited by examiner

*Primary Examiner* — John E Breene
*Assistant Examiner* — Nigel H Plumb
(74) *Attorney, Agent, or Firm* — Scott Richardson; Parker Justiss, P.C.

(57) ABSTRACT

The disclosure presents processes to locate one or more quantum gravimeters at a hydrocarbon well site, with at least one quantum gravimeter at a surface location. One or more additional gravimeters, whether quantum gravimeters or non-quantum gravimeters, can be located downhole a wellbore of the well site. Gravitational data collected from various gravimeters can be analyzed to produce analyzed gravitational parameters and subterranean formation parameters. In some aspects, the gravitational data can be processed, such as by an inversion algorithm or a noise reduction algorithm. The generated results can be used to calibrate non-quantum gravimeters located proximate the well site or downhole the wellbore, identify a depth and direction of a water front, identify the fluid flow of hydrocarbons or water in the subterranean formation, to identify orphaned hydrocarbon reservoirs, or other characteristics of fluid flow or subterranean formation parameters, such as subterranean formation damage.

38 Claims, 6 Drawing Sheets

QUANTUM GRAVIMETERS FOR HYDROCARBON RESERVOIR ANALYSIS

TECHNICAL FIELD

This application is directed, in general, to analyzing hydrocarbon reservoirs and, more specifically, to employing quantum gravimeters to aid analysis.

BACKGROUND

In developing a hydrocarbon reservoir or performing operations for hydrocarbon production, various types of fluids are often pumped downhole and fluids, hydrocarbons, and subterranean formation material can be removed from the downhole location. These changes in the mass at various locations within the subterranean formation can be measured and used as inputs to future stages of developing or producing hydrocarbons within the reservoir. Conventional gravimeters can be used to measure the change in gravity at various points of the subterranean formation. Conventional gravimeters are subject to drift and other issues that reduce their effectiveness for well site operations. It would be beneficial to have a more accurate and efficient way to measure changes in gravity of a reservoir.

SUMMARY

In one aspect, a method is disclosed. In one embodiment, the method includes (1) locating one or more surface quantum gravimeters at a surface location proximate a well site of a reservoir, where the well site is for moving fluids into or out of the reservoir and has one or more wellbores, (2) collecting gravitational data at the one or more surface quantum gravimeters, and (3) processing the gravitational data received from the one or more surface quantum gravimeters, generating analyzed gravitational parameters and subterranean formation parameters that indicate mass changes within a subterranean formation of the reservoir as a stage of a well site operation plan is executed.

In a second aspect, a system is disclosed. In one embodiment, the system includes (1) a set of quantum gravimeters positioned to collect gravitational data of a subterranean formation of a reservoir, wherein the reservoir has well sites for hydrocarbon extraction, (2) a data transceiver, capable of receiving the gravitational data from the set of quantum gravimeters, and (3) a gravitational processor, capable of communicating with the data transceiver and analyzing the gravitational data to generate analyzed gravitational parameters and one or more subterranean formation parameters.

In a third aspect, a computer program product having a series of operating instructions stored on a non-transitory computer-readable medium that directs a data processing apparatus when executed thereby to perform operations to determine subterranean formation parameters and analyzed gravitational parameters is disclosed. In one embodiment, the computer program product has operations that include (1) receiving collected gravitational data from one or more surface quantum gravimeters, wherein the one or more surface quantum gravimeters are located at a surface location proximate a well site of a reservoir, where the well site is for hydrocarbon production and has one or more wellbores, (2) processing the gravitational data received from the one or more surface quantum gravimeters, generating the analyzed gravitational parameters and the subterranean formation parameters that indicate fluid movement in a subterranean formation of the reservoir as a stage of a well site operation plan is executed, and (3) directing a modification the well site operation plan using the analyzed gravitational parameters and the subterranean formation parameters.

BRIEF DESCRIPTION

Reference is now made to the following descriptions taken in conjunction with the accompanying drawings, in which.

DETAILED DESCRIPTION

In the hydrocarbon production industry, reservoirs can be identified having potential hydrocarbons in subterranean formations below the surface. Developing the reservoir can be performed using various techniques, such as drilling one or more wellbores, injecting fluid, such as water, brine, or carbon dioxide into a wellbore, hydraulic fracturing (HF), or using other techniques. As fluids, gasses, brine, or water (collectively, fluids) is pumped downhole, or as hydrocarbons or other subterranean formation material is extracted from a subterranean formation region (e.g., moving fluids into or out of the wellbore), the mass distribution of material and fluids in the subterranean formation can change. This can be due to the injection or extraction of material and fluids, or from a change in distribution of material or fluids within the subterranean formation.

The change in mass distribution in the subterranean formation can be measured using gravimeters, collecting gravitational data due to changes in the gravitational gradient. Conventional gravimeters used in hydrocarbon production industries can be located at a surface location and can be subject to calibration errors over time, such as drift. Being able to improve the accuracy of the collected gravitational data to produce a more accurate representation of the various fluid flows in a subterranean formation would be beneficial. It can improve the drainage of a subterranean formation reservoir while minimizing the amount of waste water extracted with the hydrocarbons.

This disclosure presents processes to improve the measurement of gravitational gradient changes over time as well sites are developed or hydrocarbons are produced. Knowing how close a water front, such as from an underground water source, is to a wellbore can be used to determine if specified zones of the wellbore should be closed. Existing sensors can detect water after it enters the wellbore, while this disclosure demonstrates a way to detect the water at a distance away from the wellbore where corrective action can be performed. For example, diverter material can be delivered to specified fractures in a HF wellbore to close them off to prevent water from entering the wellbore, or valves can be opened or closed at an injection wellbore, or zones can be closed in a production wellbore.

In some aspects, the disclosed processes can measure carbon sequestration. Carbon sequestration can be observed by measuring the carbon dioxide going into the subterranean formation and the carbon dioxide that remains in the subterranean formation. In some aspects, carbon sequestration can include measuring the amount of carbon dioxide that chemically reacts downhole, such as through a process called mineral carbonation to form rock-like materials.

The gravitational gradient changes can be detected, in part, since the density of gases, water, and oil are different from each other. Changes in the mass of one of the fluids can change the gravitational gradients. For example, in a demonstration well site, when 1000 barrels per day (BPD) is produced, then the daily mass change can be approximately a half million pounds. This mass change can cause the changes in the gravitational gradient. The collected gravitational data can represent an absolute gravity reading, a relative gravity reading, or a combination of gravity readings. The gravity measurements can include magnitude and direction.

Quantum gravimeters can be used to collect the gravitational data. A quantum gravimeter is a matter-wave interferometer that is sensitive to small changes in gravitational attraction. In some aspects, quantum gravimeters can use rubidium atoms that are cooled by lasers to just above absolute zero. In some aspects, the quantum gravimeters can cool the measuring atoms, such as rubidium, to less than 10 Kelvin. The cloud of atoms is propelled upward in a high vacuum and then measured as they fall back under gravity.

One of the advantages of a quantum gravimeter is that it has negligible drift. The drift can be less than 10 micro Galileos per day and can be less than 0.1 micro Galileos per day. A Galileo is a unit of measuring gravity and equals one milli-g. For example, the Earth's average gravity is 981 Galileos. Another unit is the Eotvos which is the gravity gradient. An Eotvos is a nano Galileo per centimeter. An average sized adult human who is two meters away can produce approximately one Eotvos of gravity gradient towards them.

Another advantage of a quantum gravimeter is increased sensitivity as compared to non-quantum gravimeters. Quantum gravimeters can have accuracy greater than 10 micro Galileos and can have accuracy finer than 1 micro Galileo. As a result, gradients finer than 10 Eotvos can be obtained and many finer than 0.1 Eotvos or even 1 milli Eotvos can be determined.

There are two types of gravimeters: absolute gravity sensors and gravity gradient sensors. A relative gravimeter is a type of gravity gradient sensor. The gravimeters can be scalar measuring an amplitude, one directional, or three-directional. For surface applications, there can be two types of installations: fixed gravimeters and moving gravimeters, e.g., mobile gravimeters.

At least one quantum gravimeter is present at a reservoir. In some aspects, the quantum gravimeter can be located proximate an injection well site (e.g., an injection well system), a HF well site (e.g., a HF well system), a production well site (e.g., a production well system), or an observation well site (e.g., an observation well system). The reservoir or wellsite within the reservoir area can have more than one well site or well site type. For example, there could be an injector/producer combination, with one or more injector wellbores and one or more producer wellbores. In some aspects, the injector and producer wellbores can be the same wellbore. In some aspects, HF wellbores can be used in various combinations with one or more injector and producer wellbores.

In some aspects, the fixed quantum gravimeter can be fixedly attached at the surface. In some examples, it can be located near the wellbore such as in the yard. In other examples, it can be a distance from the wellbore, remaining proximate the wellsite, so that it can register ground water changes and can be less sensitive to hydrocarbon flow. The fixed quantum gravimeter can provide a continuous measurement of the gravitational acceleration (or, alternatively, gravitational gradient). The continuous measurements can include a measurement once every minute, day, week, or other collection time interval. The measurements can allow the fixed quantum gravimeter to distinguish between the slow formation drain versus the faster changes from tides, surface equipment, or water table changes.

The quantum gravimeter can have a significantly lower amount of drift as compared to conventional, non-quantum gravimeters, currently employed. This can improve the accuracy of the gravitational data collected. In some aspects, the gravitational data collected can be utilized as input data to calibrate non-quantum gravimeters located at the same reservoir area. In some aspects, gravitational data from a fixed quantum gravimeter can be utilized by a user or be automatically used to calibrate a mobile non-quantum gravimeter.

In some aspects, the quantum gravimeter can be located at a surface location proximate to the reservoir. In some aspects, there can be more than one gravimeter at a surface location, such as a mix of quantum gravimeters and non-quantum gravimeters. In some aspects, the non-quantum gravimeters can be MEMs-based, accelerometer, or resonant spring gravimeters. In some aspects, all of the surface gravimeters can be quantum gravimeters. In some aspects, one or more of the surface gravimeters can be mobile, meaning that a gravimeter can collect gravitational data for a specified integration time interval then move to another location on the surface and collect additional gravitational data at the subsequent collection time interval.

In some aspects, the gravimeters, whether a quantum gravimeter or a non-quantum gravimeter, can collect gravitational data over an integration time interval. One set of gravitational data can be collected over the integration time interval, such as 1 second, 100 seconds, 1,000 seconds, or other smaller or larger time intervals. Increased resolution can be achieved by increasing the integration time interval for the measurement, e.g., the longer the integration time interval can improve the accuracy of the collected gravitational data to a certain limit. Too long of an integration time interval could cause a blurring of the gravitational data as fluid flows into or out of the subterranean formation region being measured.

In some aspects, the gravimeters proximate to the reservoir can continuously collect gravitational data, for each integration time interval. Changes to the gravitational gradient may not change rapidly, so continuously collecting gravitational data can impose constraints on efficiency, power consumption, or data storage. Therefore, in some aspects, a collection time interval can be utilized where the gravimeters collect gravitational data at specified times or after an elapse of the collection time interval. The collection time interval can be one minute, one hour, one day, or shorter or longer time periods as specified by the well site operation plan or reservoir operation plan.

In some aspects, a gravity gradient can be measured using two gravimeters that are at a fixed distance apart. In some aspects, three gravimeters can be used, at fixed separation distances from each other, to determine changes in the gravity gradient. This type of gravimeter system can estimate the distance to the subterranean mass that is changing over time.

One challenge from a surface gravitational mapping is that it can be uncertain at what depth the gravity is changing. The surface gravitational map can be subject to noise from the surface. For example, changes in a water table can produce gravitational changes that can appear very large due to the closeness of the water table versus the farther distance to hydrocarbon formations. Similarly, soil subsidence, tidal effects, barometric pressure, or vehicle movement can cause larger signals than the downhole fluid movement.

The downhole fluid movement can be determined using the gravity measurement, the gravity gradient measurement, or a combination thereof. The gravity gradient can provide an estimate for the distance from the mass. The magnitude of gravity decreases by $1/R^2$, where R is the distance to the mass. Thus, the rate of change of the gravity, e.g., the gravity gradient, can be used to estimate the distance to the mass. If the mass change is a water table, such as in the above example, then the $1/R^2$ change is much greater because the distance is much less than a more distant subterranean mass, such as an oil reservoir.

To compensate for the uncertainty of depth, one or more downhole gravimeters, i.e., a set of downhole gravimeters, can be used in combination with the one or more surface gravimeters, i.e., a set of surface gravimeters. The combination can provide an improved representation of the fluid and mass changes occurring in the subterranean formation, such as fluid movement, and can be used to reduce gravimetric noise. For example, gravimetric noise can consist of changes in the water table due to flood or drought conditions. The fixed surface gravimeter can determine the gravimetric effects of the water table changes by noting the rate of change of the gravimetric changes and correlating the gravimetric changes with rain fall as well as direct water table measurements, where the water table measurements or weather/environmental parameters can be used as input parameters to the disclosed methods. Analysis of the gravitational data from the fixed quantum gravimeter can have trouble determining the extent of the reservoir remaining and whether any sections of trapped hydrocarbons were left behind. A survey, including the fixed quantum gravimeter and a set of downhole or mobile gravimeters can allow mapping of these spatially distributed areas.

In some aspects, a downhole gravimeter can be used in conjunction with the surface quantum gravimeter, and other surface gravimeters if being used. The gravitational data collected by the downhole gravimeter can be used in the processing of gravitational data to determine the analyzed gravitational parameters and subterranean formation parameters. In some aspects, there can be more than one downhole gravimeter. The downhole gravimeters can utilize one or more different collection time intervals or integration time intervals, and need not be the same as the collection time interval or integration time interval utilized by the surface quantum gravimeter.

If the downhole gravimeter is a non-quantum gravimeter, then one or more of the surface quantum gravimeters can be used to calibrate the downhole gravimeter. In some aspects, one or more of the set of downhole gravimeters can be a quantum gravimeter. The gravimeters in the set of downhole gravimeters can be placed at fixed locations along the wellbore, for example, no closer than a length of pipe segment, 20,000 feet apart, or other distances can be used.

In some aspects, the gravimeters in the set of downhole gravimeters have a lesser sensitivity than the gravimeters used at the surface locations. This is due to the environmental conditions experienced downhole that could adversely impact the type of gravimeter used downhole and the effectiveness of its operations. Conventional gravimeters can drift by 0.1 milliGalileos per day at room temperature. At downhole temperatures, the drift of a conventional gravimeter can exceed 1 milliGalileos per day.

In some aspects, a combination of multiple gravity measurements can allow for a better mapping of the movement of downhole fluids by using a gravitational numerical model to minimize gravitational noise. In some aspects, an inversion process can be applied to the gravitational data to remove noise.

In some aspects, the gravitational data can be communicated to a computing system, a well site controller, a reservoir controller, a data center, a cloud environment, or other well site equipment or distant computing system. The gravitational data from one or more quantum gravimeters and zero or more non-quantum gravimeters can be processed and analyzed.

In some aspects, the result of the processing can be analyzed gravitational parameters, for example, gravitational gradients, calibration parameters for non-quantum gravimeters, and other types of gravitational parameters. In some aspects, the result of the processing can be subterranean formation parameters, for example, localizing a water table, localizing a water front, identifying orphaned hydrocarbon fields, determining a size and location of a remaining hydrocarbon reservoir, determining the flow of injected fluid or HF slurries, identifying damage, or other features or characteristics of the subterranean formation.

In some aspects, the subterranean formation parameters can specify one or more mass changes in one or more parts or regions of the subterranean formation. In some aspects, the analyzed gravitational parameters can specify a determined depth parameter of a fluid in the subterranean formation. In some aspects, the analyzed gravitational parameters can specify a determined direction parameter to a fluid in the subterranean formation. In some aspects, the analyzed gravitational parameters can specify a determined fluid movement parameter of a fluid flow or a gravimetric noise parameter. In some aspects, the gravimetric noise parameter can be determined using a gravitational numerical model.

In some aspects, the subterranean formation parameters can specify a determined subterranean formation damage parameter, for example, a deposition of solids during injection or a scale deposition during production. A damage parameter can be used to describe the amount of deposition at a location of the wellbore and thereby provide a warning of a potential stuck pipe scenario. A well site operation plan or a reservoir operation plan can be updated or modified using the analyzed gravitational parameters or the subterranean formation parameters.

Figure 1:
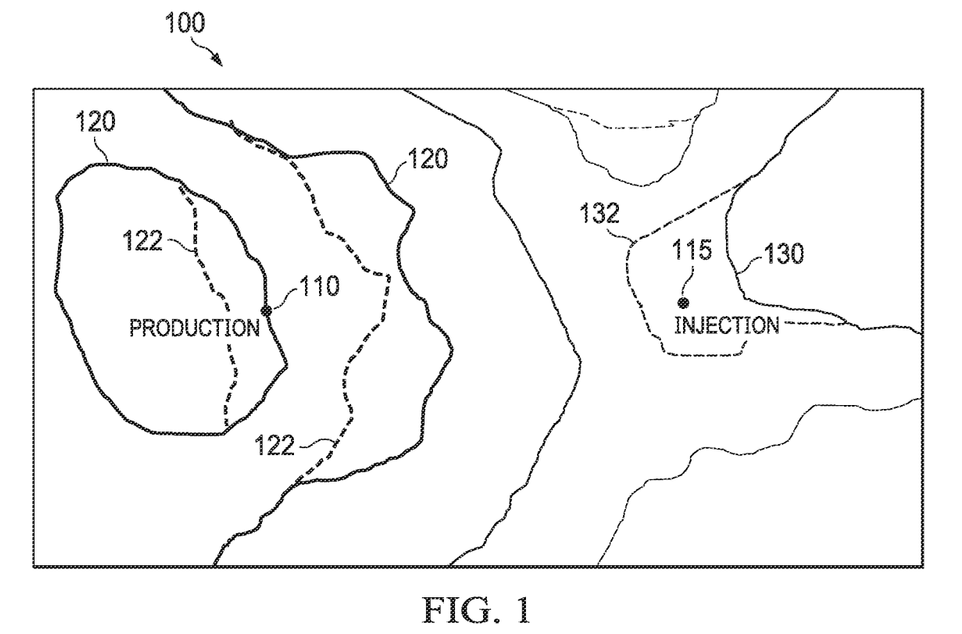
FIG. 1 is an illustration of a diagram of an example well site with a production well and an injection well.

Turning now to the figures, FIG. 1 is an illustration of a diagram of an example well site 100 with a production well and an injection well. In other aspects, there can be one or more additional well sites, such as production wells, injection wells, observation wells, and other types of well sites. A surface gravimeter can be utilized to map how the gravitational attraction changes over time.

The solid lines in the contour plots represent the gravity as measured from the surface. The gravitational acceleration can vary, for example, by 2 milliGalileos to 100s of milliGalileos. Over time, the gravitational acceleration can change as fluids are produced and fluids are injected. The contour lines of the gravitational acceleration can vary after a time period of well site or reservoir operations. Gravitational attraction can be decreased proximate the production well and can be increased proximate the injection well.

Well site 100 includes a production well site 110 and an injection well site 115. Solid lines 120 proximate production well site 110 indicate the gravitational gradient prior to fluid being injected in the reservoir by injection well site 115. Dashed lines 122 proximate production well site 110 indicate the gravitational gradient after fluid has been injected by injection well site 115. Likewise, solid line 130 proximate injection well site 115 indicates the gravitational gradient prior to fluid injection, and dashed line 132 proximate injection well site 115 indicates the gravitational gradient after fluid injection. The quantum gravimeter and zero or more additional gravimeters of various types can be used, after data analysis, to detect the gravitational gradient movement from solid lines 120 to dashed lines 122, and solid line 130 to dashed line 132.

Figure 2:
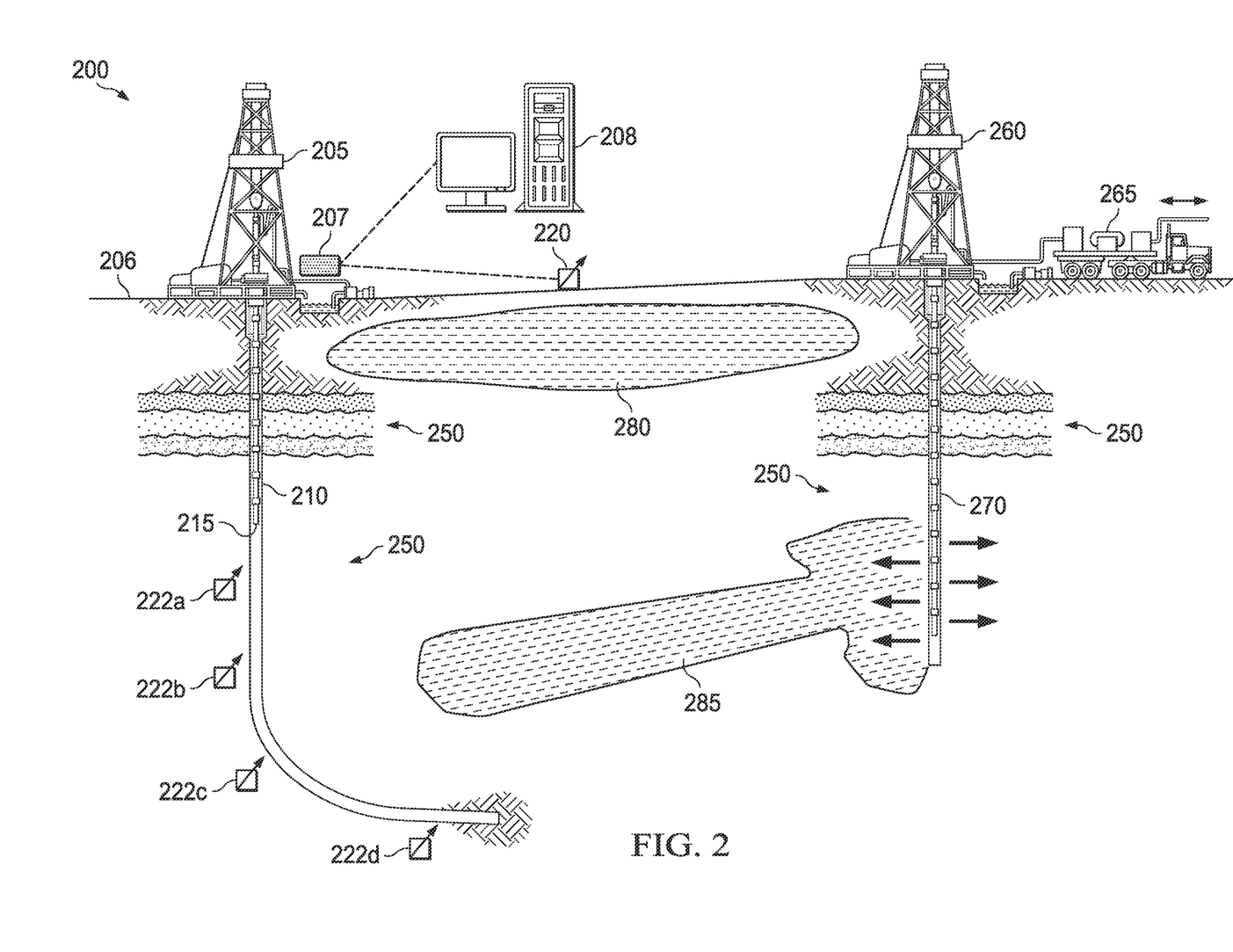
FIG. 2 is an illustration of a diagram of an example well site demonstrating an injection fluid flow detection.

FIG. 2 is an illustration of a diagram of an example well site 200 demonstrating an injection fluid flow detection. The challenge from a surface gravitational mapping is that it can be uncertain at what depth the fluids are moving. If the injected fluids are short-circuiting to the production well, then the gravitational contour map can have difficult identifying that the fluids are moving at a single zone rather than moving across the entire formation. Additionally, the surface gravitational map can be subject to noise from the surface. For example, changes in the water table can produce gravitational changes that can appear very large due to the closeness of the water table and the farther distance to hydrocarbon formation.

Depth information can be obtained by combining the surface gravimetry with downhole gravimetry. The downhole gravimeter can be fixedly attached to the downhole tubing, preferably as part of the downhole completion that would also include screens and possibly a flow restrictor. The gravimeter can be part of the injector, the producer, or both, or as a separate observation well. Multiple downhole gravimeters can be part of the completion and can communicate their respectively collected measurements to the surface through conventional communication techniques.

The signal from the non-moving downhole gravimeters can be combined with the surface gravimeter to map the depth of the fluid movement as well as to improve the distinguishment between fluid movement in the reservoir and gravimetric noise. For example, a well site which has high-density water being injected and lower density hydrocarbons being produced, and where a water table exists near the surface, can cause gravimetric noise. Gravimetric noise can consist of changes in the water table due to flood or drought conditions.

Well site 200 includes a derrick 205 at a surface 206, a well site controller 207, and a computing system 208. Well site controller 207 can be positioned central to the well site operation or local to the one or more equipment devices to form a data network among other equipment devices or data transmitters. Well site controller 207 includes a processor and a memory, and is configured to direct operation of well site 200. Derrick 205 is located at a surface 206.

Extending below derrick 205 is a wellbore 210 with a fluid pipe 215 positioned within wellbore 210. Fluid pipe 215 is shown as ending with a dashed pipe indicating that fluid pipe 215 can extend to various lengths, with a maximum length being the length of wellbore 210. There can be downhole tools located at one or more locations within wellbore 210, for example at an end of fluid pipe 215, at one or more locations along a casing, or at one or more locations along wellbore 210 where there is no casing. The downhole tools can include various tools, such as sensors, pumps, and other tools. Other components of downhole tools can be present, such as a local power supply (e.g., generators, batteries, or capacitors), telemetry systems, transceivers, and control systems. Wellbore 210 is surrounded by subterranean formation 250.

Well site controller 207 or computing system 208 which can be communicatively coupled to well site controller 207, can be utilized to communicate with the downhole tools, such as sending and receiving telemetry, data, instructions, subterranean formation measurements, gravitational data, and other information. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 208 or well site controller 207. Well site controller 207 or computing system 208 can communicate with the downhole tools using conventional means, now known or later developed, to direct operations of the downhole tools.

Well site 200 includes an injection well 260 with a pumping system 265. Injection well 260 is pumping an injection fluid 285 downhole wellbore 270. The arrows proximate wellbore 270 indicate that injection fluid 285 enters subterranean formation 250 at various locations.

At surface 206, there is a quantum gravimeter 220. In some aspects, more than one quantum gravimeter can be present at surface 206, or other types of gravimeters can be present. A water table 280 is present in this example. Quantum gravimeter 220 can be affected by gravitational noise from water table 280 due to the proximity of water table 280 to quantum gravimeter 220. The gravitational noise could affect the accuracy of the analyzed gravitational parameters and subterranean formation parameters leading to a misrepresentation of an injection fluid 285, which is shown as extending close to wellbore 210.

To improve detection of this extension of injection fluid 285, and thereby allowing corrective actions to be conducted, such as closing specific valves or zones in wellbore 270 or in wellbore 210, additional gravimeters can be located downhole. At fixed locations within wellbore 210 are a gravimeter 222a, a gravimeter 222b, a gravimeter 222c, and a gravimeter 222d, collectively, a set of downhole gravimeters 222. Set of downhole gravimeters 222 can be one or more of various types of gravimeters, such as quantum gravimeters, MEMs gravimeters, or other types of gravimeters. The gravitational data collected by set of downhole gravimeters 222, combined with the gravitational data collected by quantum gravimeter 220 can produce an improved accuracy of the analyzed gravitational parameters and subterranean formation parameters. In this example, an improved detection of the finger extension of injection fluid 285 can be produced, such as improved accuracy of depth and direction parameters.

Figure 3:
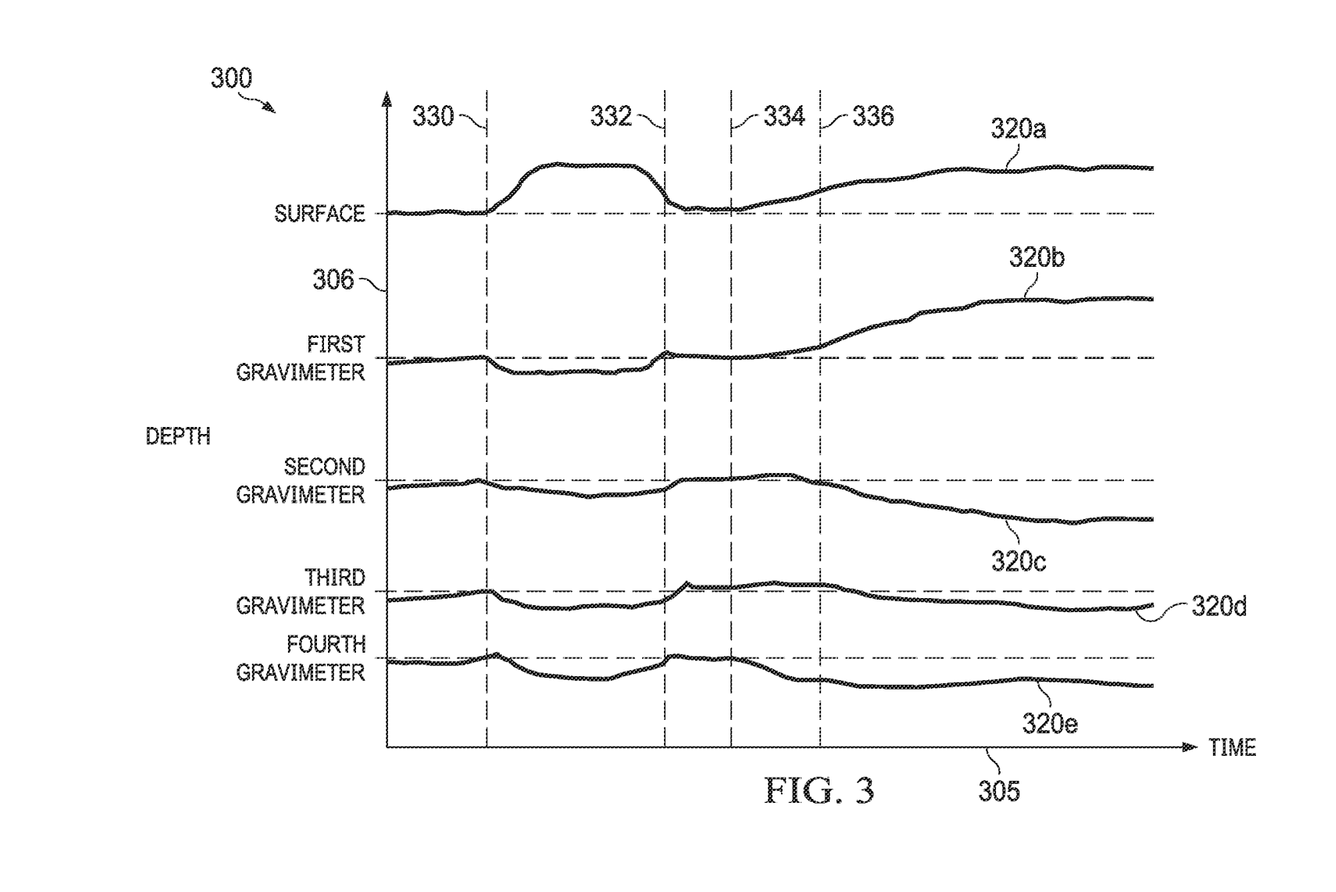
FIG. 3 is an illustration of a diagram of an example graph demonstrating a water front detection.

FIG. 3 is an illustration of a diagram of an example graph 300 demonstrating a water front detection. Graph 300 is demonstrating a time trace of the collected gravimetric data, where relative changes in the gravimetric data can indicate what is happening in the subterranean formation. Changes in the water table, such as a higher water table after heavy rain, can have a greater change at the surface than deep downhole a wellbore and can be detected where the gravimetric data changes in opposite directions. Each of the gravimeter sensors can have a different baseline gravitational acceleration that can be correlated to the depth from the surface.

Graph 300 has an x-axis 305 which shows the progression of time. A y-axis 306 indicates the depth from a surface location. Y-axis 306 identifies a surface quantum gravimeter and the relative depths of four downhole gravimeters. For example, the surface quantum gravimeter can be quantum gravimeter 220, and the four downhole gravimeters can be set of downhole gravimeters 222. The surface quantum gravimeter collects gravitational data used to plot line 320a. The first downhole gravimeter collects gravitational data used to plot line 320b. The second downhole gravimeter collects gravitational data used to plot line 320c. The third downhole gravimeter collects gravitational data used to plot line 320d. The fourth downhole gravimeter collects gravitational data used to plot line 320e.

The finger extension of injection fluid 285 can be first detected by the surface quantum gravimeter and the fourth gravimeter, gravimeter 222d, since these gravimeters are closer to injection well 260. The relative strength of the analyzed gravitational parameters between the surface quantum gravimeter and the fourth gravimeter can provide an estimate of the depth of the fluid change.

The relative changes between the gravitational data collected from the downhole gravimeters can provide indicators for the depth of the fluid movement. Stronger changes can be detected by the gravimeters closer to the fluid flow and the relative magnitude of the change can indicate a relative position.

Dashed line 330 indicates a time when a high water table, such as water table 280, has been detected. A dashed line 332 indicates a time when the high water table has been compensated for in the analysis of the gravitational data. A dashed line 334 indicates a time when a water front, such as the finger extension of injected fluid 285, is first detected. At dashed line 334, analysis of plot line 320a shows a beginning of a trend upwards and analysis of plot line 320e shows a beginning of a trend downwards.

At a dashed line 336, the water front is continuing to approach the wellbore, approaching the downhole gravimeters. At dashed line 336, analysis of plot line 320a and plot line 320e shows a steeper change in the gravitational gradient, relative to the analysis at dashed line 334. Analysis of plot line 320b, plot line 320c, and plot line 320d demonstrate a smaller trend in a respective of an upwards or downwards direction. The upwards or downwards direction can assist in deriving the depth of the water front.

The surface gravimetric data can be important for determining the direction from which the fluids are moving. The fixed downhole readings can provide an indication of depth while being less accurate on the direction. The surface gravimetric data can be used to determine an indication of direction of the water front while being less accurate to estimate its depth. The combination of surface and downhole gravimeters can be utilized to improve the analysis of the gravitational data and improve the accuracy of water front detections, hydrocarbon detections, and other fluid detections.

The downhole gravimeters can have lesser sensitivity than the surface gravimeters as they are closer to the moving fluids and having a high-sensitivity, high-temperature, small-size, non-replaceable, low-power downhole sensor can be difficult.

Graph 300 is demonstrated using absolute gravity readings. A similar result can be obtained utilizing relative gravity readings, or utilizing a combination of absolute and relative gravity readings. Graph 300 uses the injector/producer model as shown in well site 200 of FIG. 2. In some aspects, there can be multiple injectors, multiple producers, no injectors, a single well that is used for injection as well as for production, or various combinations thereof. HF well sites are a combination of injection and production well systems and the disclosed processes can be used in that type of well system.

Figure 4:
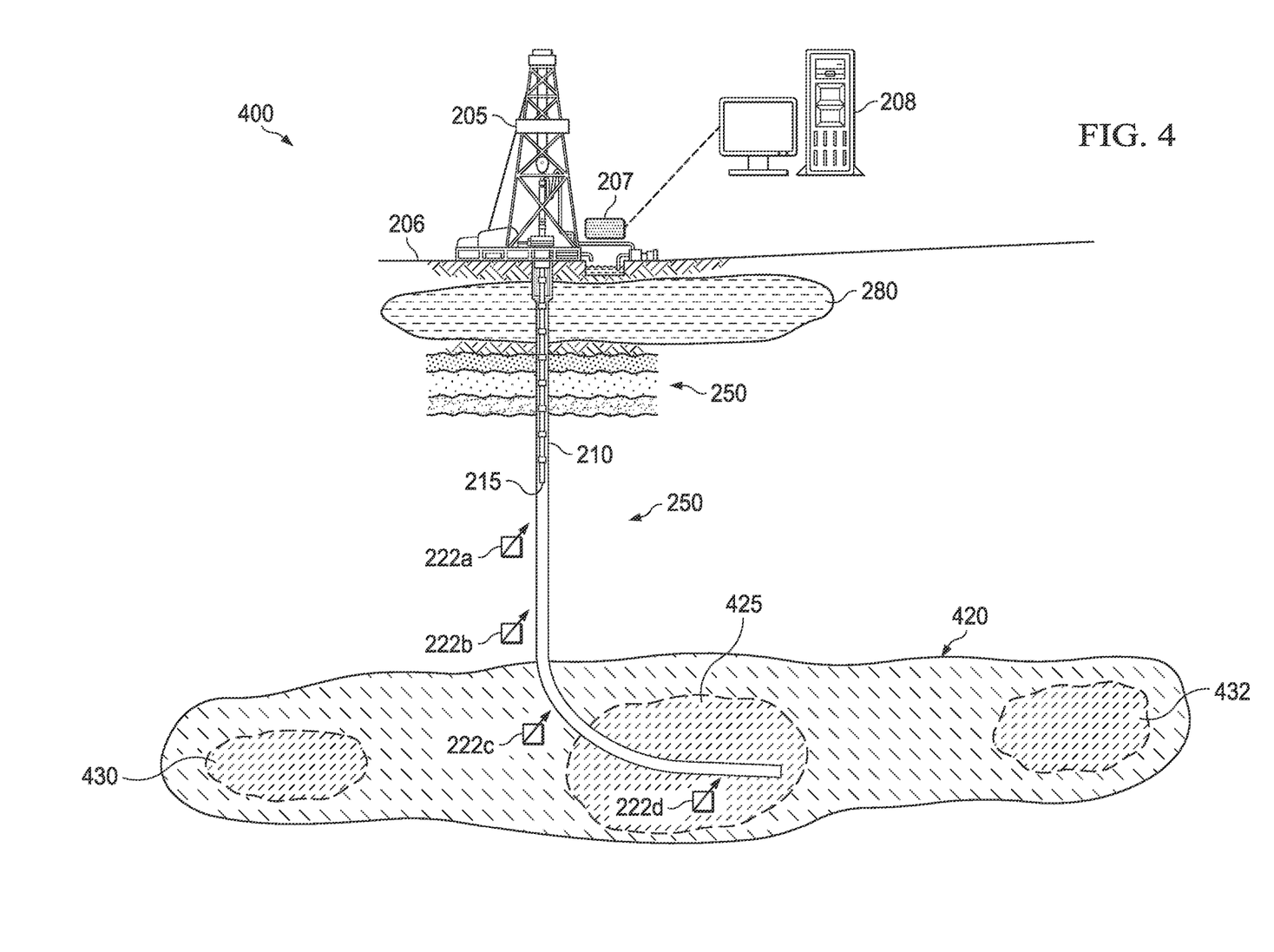
FIG. 4 is an illustration of a diagram of an example well site demonstrating orphaned hydrocarbon reservoir detection.

FIG. 4 is an illustration of a diagram of an example well site 400 demonstrating orphaned hydrocarbon reservoir detection. Well site 400 utilizes the same production well system as shown in well site 200 of FIG. 2. Set of downhole gravimeters 222 are positioned similarly as in well site 200. Overlaid set of downhole gravimeters 222 and wellbore 210 is an original hydrocarbon reservoir 420.

During the production operation stages, original hydrocarbon reservoir 420 has been reduced through the removal of hydrocarbons up through wellbore 210. At a future production operation stage, original hydrocarbon reservoir 420 has shrunk as shown by hydrocarbon reservoir 425. In this demonstration, there are two orphaned hydrocarbon reservoirs, shown as hydrocarbon reservoir 430 and hydrocarbon reservoir 432. These types of fluid movement, reservoir sizing, reservoir location, orphan reservoir identification, and other reservoir fluid changes can be detected by analyzing the collected gravitational data from the surface quantum gravimeter and the one or more downhole gravimeters.

Figure 5:
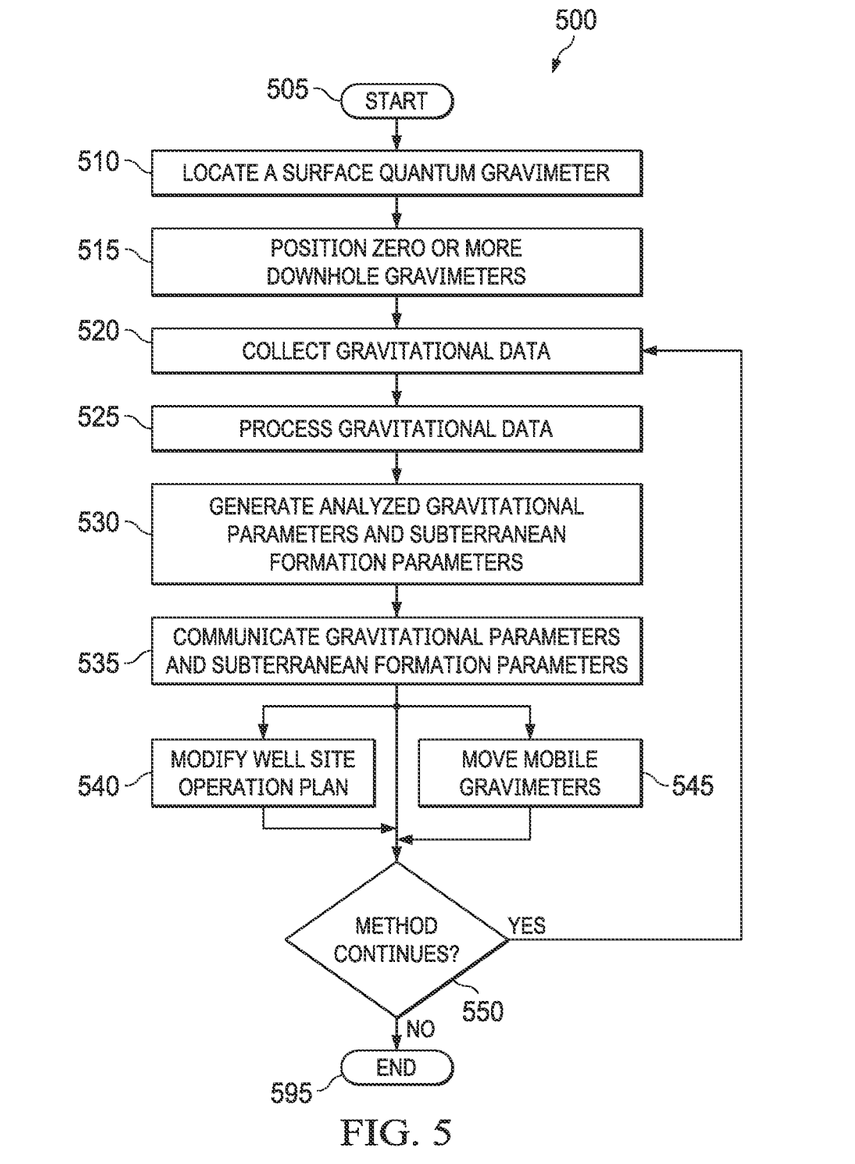
FIG. 5 is an illustration of a flow diagram of an example method to collect and analyze gravitational data.

FIG. 5 is an illustration of a flow diagram of an example a method 500 to collect and analyze gravitational data. Method 500 can be performed, for example, by users performing analysis operations. Some steps of method 500 can be performed on a computing system, for example, quantum gravimeter data analyzer system 600 of FIG. 6 or quantum gravimeter data analyzer controller 700 of FIG. 7. The computing system can be a reservoir controller, a well site controller, a data center, a cloud environment, a server, a laptop, a mobile device, or other computing system capable of receiving the gravitational data, input parameters, and capable of communicating with other computing systems. Some steps of method 500 can be encapsulated in software code or in hardware, for example, an application, code library, dynamic link library, module, function, RAM, ROM, and other software and hardware implementations. The software can be stored in a file, database, or other computing system storage mechanism. Some steps of method 500 can be partially implemented in software and partially in hardware.

Method 500 starts at a step 505 and proceeds to a step 510. In step 510, a quantum gravimeter can be located at a surface location of a well site proximate a hydrocarbon reservoir. In some aspects, one or more additional gravimeters can be positioned at the surface, where the gravimeters can be quantum gravimeters, non-quantum gravimeters, or a combination thereof. In a step 515, zero or more gravimeters, which can be various combinations of quantum gravimeters and non-quantum gravimeters, can be located at positions downhole a wellbore of the well site.

In a step 520, gravitational data can be collected from each of the active gravimeters located at the surface proximate the well site or downhole a wellbore of the well site. The data can be collected over an integration time interval, where a longer integration time interval can generally improve the resolution of the gravitational data collected. An excessively long integration time interval could begin the cloud or blur the data as subterranean formation fluids shift in real time. The integration time interval can be the same, different, or a combination thereof across each of the active gravimeters.

Each gravimeter can collect gravitational data over its respectively specified integration time interval at each collection time interval. Depending on the operation plan stage, the collection time interval can be modified. For example, during active injection stages, the collection time interval can be smaller, such as one minute, one hour, or another time interval. During a non-active injection stage, the collection time interval can be larger, such as a day, three days, or a week, where the natural flow of subterranean formation fluids can be measured.

In a step 525, a computing system can receive the collected gravitational data from one or more of the active gravimeters. The computing system can be proximate the well site or distant from it. For example, the computing system can be a reservoir controller, a well site controller, a server, a laptop, a data center, a cloud environment, an edge computing system, or other type of computing systems. The gravitational data can be analyzed, using each set of received gravitational data. In some aspects, a pre-processing can be applied to the gravitational data, for example, an inversion process. In some aspects, noise reduction algorithms can be applied. In some aspects, a machine learning system or a deep neural network system can be utilized to process and analyze the gravitational data. A machine learning or deep neural network system can apply learnings from other gravitational data collections at this well site or other well sites to further improve noise reduction and improve the resulting analysis.

In a step 530, the computing system can generate the analyzed gravitational parameters and the subterranean formation parameters, i.e., the results. The analyzed gravitational parameters can include, for example, gravitational gradients, calibration parameters for non-quantum gravimeters, and other types of gravitational parameters. The subterranean formation parameters can include, for example, localizing a water table, localizing a water front, identifying orphaned hydrocarbon fields, determining a size and location of a remaining hydrocarbon reservoir, determining the flow of injected fluid or HF slurries, identifying damage, or other features or characteristics of the subterranean formation.

In a step 535, the analyzed gravitational parameters and subterranean formation parameters can be communicated to one or more systems. For example, the results can be communicated to a well site operation plan system within a well site controller. The results can be communicated to another system or equipment proximate the well site or distant from the well site.

Method 500 can optionally proceed to a step 540, to a step 545, or a decision step 550. Step 540, step 545, or decision step 550 can be performed in serial, parallel, overlapping, or various combinations thereof, and in various orders. In aspects, where step 540 and step 545 are not performed, then method 500 proceeds to decision step 550.

In step 540, the analyzed gravitational parameters and the subterranean formation parameters can be utilized to modify a well site operation plan or a reservoir operation plan. Method 500 proceeds to decision step 550. In step 545, if mobile gravimeters are being utilized, then they can be moved to their next designated location. Method 500 proceeds to decision step 550.

In decision step 550, a determination can be made whether the method ends or method 500 continues to step 520 after the next collection time interval. The method can end due to various factors, such as a change in the stage of a well operation plan or a reservoir operation plan, or another end of method event as specified by the respective operation plan or a user. If decision step 550 resultant is 'Yes', method 500 proceeds to step 520. If decision step 550 resultant is 'No', method 500 proceeds to a step 595 and the method ends.

Figure 6:
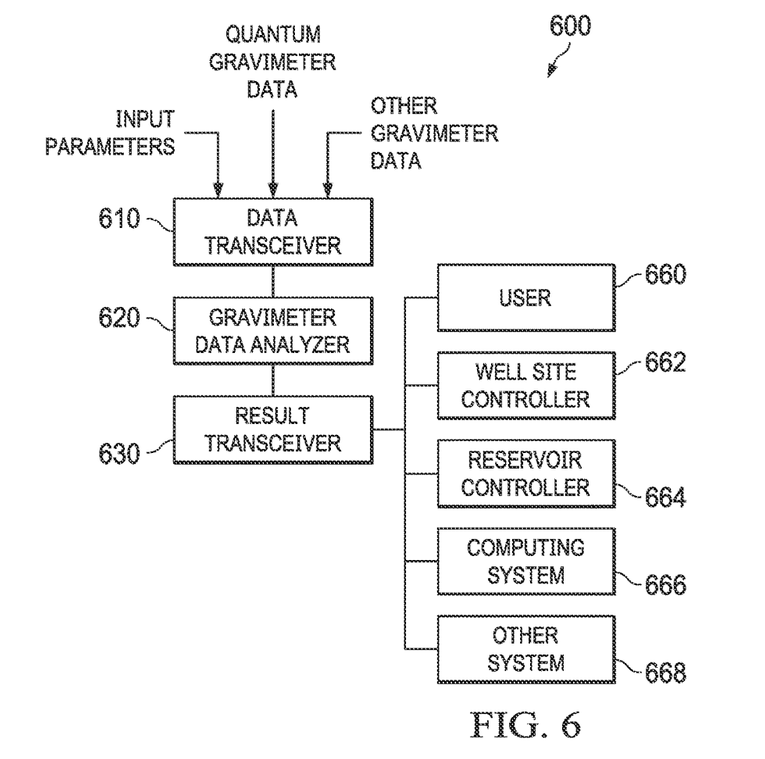
FIG. 6 is an illustration of a block diagram of an example quantum gravimeter data analyzer system.

FIG. 6 is an illustration of a block diagram of an example quantum gravimeter data analyzer system 600, which can be implemented in one or more computing systems, for example, a data center, cloud environment, server, laptop, smartphone, tablet, and other computing systems. In some aspects, quantum gravimeter data analyzer system 600 can be implemented using a gravimeter data analyzer controller such as quantum gravimeter data analyzer controller 700 of FIG. 7. Quantum gravimeter data analyzer system 600 can implement one or more steps of one or more methods of this disclosure, such as method 500 of FIG. 5.

Quantum gravimeter data analyzer system 600, or a portion thereof, can be implemented as an application, a code library, a dynamic link library, a function, a module, other software implementation, or combinations thereof. In some aspects, quantum gravimeter data analyzer system 600 can be implemented in hardware, such as a ROM, a graphics processing unit, or other hardware implementation. In some aspects, quantum gravimeter data analyzer system 600 can be implemented partially as a software application and partially as a hardware implementation. Quantum gravimeter data analyzer system 600 is a functional view of the disclosed processes and an implementation can combine or separate the described functions in one or more software or hardware systems.

Quantum gravimeter data analyzer system 600 includes a data transceiver 610, a gravimeter data analyzer 620, and a result transceiver 630. The results, e.g., the analyzed gravitational parameters, the subterranean formation parameters, and interim outputs from gravimeter data analyzer 620 can be communicated to a data receiver, such as one or more of a user or user system 660, a well site controller 662, a reservoir controller 664, a computing system 666, or other processing or storage systems 668. The results can be used to determine changes or modifications that may be needed to a well site operation plan or a reservoir operation plan, for example, adjusting where and when to inject an injection fluid, the composition of the injection fluid, or opening or closing valves or zones within the wellbore.

Data transceiver 610 can receive input parameters, such as parameters to direct the operation of the analysis implemented by gravimeter data analyzer 620. For example, an input parameter can be the integration time interval, collection time interval, or location for each gravimeter being utilized. In some aspects, data transceiver 610 can be part of gravimeter data analyzer 620.

Result transceiver 630 can communicate one or more results or interim outputs to one or more data receivers, such as user or user system 660, well site controller 662, reservoir controller 664, computing system 666, other processing or storage systems 668, or other related systems, whether located proximate result transceiver 630 or distant from result transceiver 630. Data transceiver 610, gravimeter data analyzer 620, and result transceiver 630 can be, or can include, conventional interfaces configured for transmitting and receiving data. In some aspects, gravimeter data analyzer 620 can be a machine learning system, for example, a deep neural network system or a machine learning algorithm. In some aspects, one or more of data transceiver 610, gravimeter data analyzer 620, or result transceiver 630 can be part of the machine learning system.

Gravimeter data analyzer 620 can implement the analysis and algorithms as described herein utilizing the gravitational data and the input parameters. For example, gravimeter data analyzer 620 can perform the noise reduction of the received gravitational data, analyze the gravitational data, and generate the analyzed gravitational parameters and the subterranean formation parameters. A memory or data storage of gravimeter data analyzer 620 can be configured to store the processes and algorithms for directing the operation of gravimeter data analyzer 620. Gravimeter data analyzer 620 can also include a processor, such as processor 730 of FIG. 7, that is configured to operate according to the analysis operations and algorithms disclosed herein, and an interface to communicate (transmit and receive) data.

Figure 7:
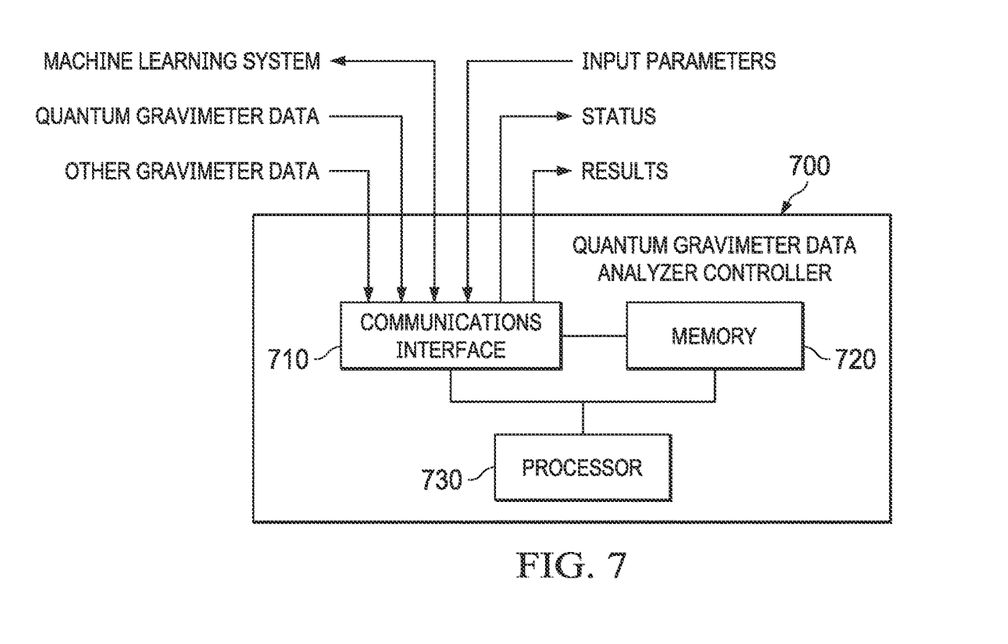
FIG. 7 is an illustration of a block diagram of an example quantum gravimeter data analyzer controller according to the principles of the disclosure.

FIG. 7 is an illustration of a block diagram of an example quantum gravimeter data analyzer controller 700 according to the principles of the disclosure. Quantum gravimeter data analyzer controller 700 can be stored on a single computer or on multiple computers. The various components of quantum gravimeter data analyzer controller 700 can communicate via wireless or wired conventional connections. A portion or a whole of quantum gravimeter data analyzer controller 700 can be located at one or more locations and other portions of quantum gravimeter data analyzer controller 700 can be located on a computing device or devices located downhole or at a surface location. In some aspects, quantum gravimeter data analyzer controller 700 can be wholly located at a surface or distant location. In some aspects, quantum gravimeter data analyzer controller 700 can be part of another system, and can be integrated in a single device, such as a part of downhole tools, or part of a well site controller or reservoir controller.

Quantum gravimeter data analyzer controller 700 can be configured to perform the various functions disclosed herein including receiving input parameters and gravitational data, and generating results from an execution of the methods and processes described herein, such as analyzed gravitational parameters and subterranean formation parameters. Quantum gravimeter data analyzer controller 700 includes a communications interface 710, a memory 720, and a processor 730.

Communications interface 710 is configured to transmit and receive data. For example, communications interface 710 can receive the input parameters and the gravitational data. Communications interface 710 can transmit the generated results, data from the input files, the gravitational data, or interim outputs. In some aspects, communications interface 710 can transmit a status, such as a success or failure indicator of quantum gravimeter data analyzer controller 700 regarding receiving the various inputs, transmitting the generated results, or producing the generated results.

In some aspects, communications interface 710 can receive input parameters from a machine learning system, for example, where the gravitational data can be processed for noise reduction or data clarity improvement, such as is described for gravimeter data analyzer 620.

In some aspects, the machine learning system can be implemented by processor 730 and perform the operations as described by gravimeter data analyzer 620. In some aspects, processor 730 can implement a process such as a computer program product having a series of operating instructions stored on a non-transitory computer-readable medium that directs a data processing apparatus when executed thereby to perform operations to generate analyzed gravitational parameters and subterranean formation parameters, the operations can include (1) collecting gravitational data at the one or more surface quantum gravimeters, (2) processing the gravitational data received from the one or more surface quantum gravimeters, generating analyzed gravitational parameters and subterranean formation parameters that specify mass changes of a subterranean formation of the reservoir as a well site operation plan stage is executed, and (3) modifying the well site operation plan using the analyzed gravitational parameters and the subterranean formation parameters.

Communications interface 710 can communicate via communication systems used in the industry. For example, wireless or wired protocols can be used. Communication interface 710 is capable of performing the operations as described for data transceiver 610 and result transceiver 630 of FIG. 6.

Memory 720 can be configured to store a series of operating instructions that direct the operation of processor 730 when initiated, including the code representing the algorithms for determining processing the collected data. Memory 720 is a non-transitory computer readable medium. Multiple types of memory can be used for data storage and memory 720 can be distributed.

Processor 730, which can be a gravitational processor, can be configured to produce the results, one or more interim outputs, or statuses utilizing the received inputs. Processor 730 can be configured to direct the operation of the quantum gravimeter data analyzer controller 700. Processor 730 includes the logic to communicate with communications interface 710 and memory 720, and perform the functions described herein. Processor 730 is capable of performing or directing the operations as described by gravimeter data analyzer 620 of FIG. 6.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the disclosed aspects in the SUMMARY can have one or more of the following additional elements in combination. Element 1: further comprising modifying the well site operation plan using the analyzed gravitational parameters and the subterranean formation parameters. Element 2: further comprising communicating the analyzed gravitational parameters and the subterranean formation parameters to a well site controller, a reservoir controller, a computing system, a data center, or a cloud environment. Element 3: wherein the well site is an injection well system and a first fluid is pumped downhole one or more of the one or more wellbores. Element 4: wherein the well site is a production well system and a second fluid is extracted from one or more of the one or more wellbores. Element 5: wherein the well site is a HF well system, and a HF fluid is pumped downhole one or more of the one or more wellbores. Element 6: wherein the well site is an observation well system. Element 7: wherein the collecting occurs at a collection time interval. Element 8: wherein the gravitational data represents one of an absolute gravity reading, a relative gravity reading, or a combination of gravity readings. Element 9: wherein one or more non-quantum gravimeters are proximate the well site. Element 10: further comprising calibrating the one or more non-quantum gravimeters using the gravitational data received from the one or more surface quantum gravimeters. Element 11: wherein one or more downhole gravimeters are located downhole one or more of the one or more wellbores. Element 12: wherein the processing uses gravitational data from the one or more downhole gravimeters. Element 13: wherein the processing determines a depth parameter of a subterranean fluid in the subterranean formation. Element 14: wherein the processing determines a direction parameter to a subterranean fluid in the subterranean formation. Element 15: wherein the processing determines a fluid movement parameter or a gravimetric noise parameter. Element 16: wherein the gravimetric noise parameter is determined using a gravitational numerical model. Element 17: wherein the processing determines a subterranean formation damage parameter. Element 18: wherein the one or more of the one or more downhole gravimeters are downhole quantum gravimeters. Element 19: wherein the one or more of the one or more downhole gravimeters are non-quantum gravimeters. Element 20: wherein the one or more downhole gravimeters are at respective fixed locations within the one or more wellbores. Element 21: wherein the one or more downhole gravimeters have lesser sensitivity than the one or more surface quantum gravimeters. Element 22: wherein the collecting further comprises receiving input parameters at one or more of the one or more surface quantum gravimeters. Element 23: wherein the input parameters specify one or more of an integration time interval or a collection time interval. Element 24: wherein the integration time interval is in a range of 1 second to 1,000 seconds. Element 25: wherein a first set of the one or more surface quantum gravimeters are at respective fixed locations and a second set of the one or more surface quantum gravimeters are movable. Element 26: wherein the collecting further comprises moving the second set of the one or more surface quantum gravimeters after the integration time interval to respective new locations and collecting additional gravitational data using the second set of the one or more surface quantum gravimeters for the integration time interval at a next collection time interval. Element 27: further comprising a result transceiver, capable of communicating the analyzed gravitational parameters, the subterranean formation parameters, and interim outputs, to a user system, a data store, or a computing system. Element 28: wherein the computing system is one or more of a reservoir controller, a well site controller, or a non-quantum gravimeter. Element 29: wherein the set of quantum gravimeters collect the gravitational data at a collection time interval. Element 30: wherein the set of quantum gravimeters collect the gravitational data over an integration time interval. Element 31: further comprising a set of non-quantum gravimeters, capable to collect a second set of gravitational data, and wherein the data transceiver is further capable of receiving the second set of gravitational data from the set of non-quantum gravimeters. Element 32: wherein at least one of non-quantum gravimeters in the set of non-quantum gravimeters is calibrated utilizing the analyzed gravitational parameters or the subterranean formation parameters. Element 33: wherein the set of non-quantum gravimeters are MEMs gravimeters. Element 34: where at least one non-quantum gravimeter in the set of non-quantum gravimeters is located downhole a wellbore of the well sites. Element 35: wherein at least one quantum gravimeter in the set of quantum gravimeters is at a fixed surface location. Element 36: wherein at least one quantum gravimeter in the set of quantum gravimeters is mobile and is moved to a new location at a determined time. Element 37: wherein at least one quantum gravimeter in the set of quantum gravimeters is located downhole a wellbore of the well sites. Element 38: wherein the one or more subterranean formation parameters include at least one of a depth parameter, a direction parameter, a fluid movement parameter, a gravimetric noise parameter, or a subterranean formation damage parameter. Element 39: further comprising a machine learning system, capable to communicate with the gravitational processor, and to process the gravitational data using one or more inversion algorithms. Element 40: wherein each gravimeter in the set of quantum gravimeters uses rubidium atoms. Element 41: wherein each gravimeter in the set of quantum gravimeters cools measuring atoms to less than 10 Kelvin.

What is claimed is:

1. A method, comprising:
    locating one or more surface quantum gravimeters at a surface location proximate a well site of a reservoir, where the well site is for moving fluids into or out of the reservoir and has one or more wellbores;

collecting gravitational data at the one or more surface quantum gravimeters, including receiving input parameters at one or more of the one or more surface quantum gravimeters, wherein the input parameters specify one or more of an integration time interval or a collection time interval; and processing the gravitational data received from the one or more surface quantum gravimeters, generating analyzed gravitational parameters and subterranean formation parameters that indicate mass changes within a subterranean formation of the reservoir as a stage of a well site operation plan is executed.

2. The method as recited in claim 1, further comprising:
modifying the well site operation plan using the analyzed gravitational parameters and the subterranean formation parameters.

3. The method as recited in claim 1, further comprising:
communicating the analyzed gravitational parameters and the subterranean formation parameters to a well site controller, a reservoir controller, a computing system, a data center, or a cloud environment.

4. The method as recited in claim 1, wherein the well site is one of an injection well system and a first fluid is pumped downhole one or more of the one or more wellbores, the well site is a production well system and a second fluid is extracted from one or more of the one or more wellbores, or the well site is a hydraulic fracturing (HF) well system, and a HF fluid is pumped downhole one or more of the one or more wellbores.

5. The method as recited in claim 1, wherein the well site is an observation well system.

6. The method as recited in claim 1, wherein the collecting occurs at a collection time interval.

7. The method as recited in claim 1, wherein the gravitational data represents one of an absolute gravity reading, a relative gravity reading, or a combination of gravity readings.

8. The method as recited in claim 1, wherein one or more non-quantum gravimeters are proximate the well site, further comprising:
calibrating the one or more non-quantum gravimeters using the gravitational data received from the one or more surface quantum gravimeters.

9. The method as recited in claim 1, wherein the processing determines one or more of a depth parameter of a subterranean fluid in the subterranean formation, a direction parameter to the subterranean fluid in the subterranean formation, a fluid movement parameter, a gravimetric noise parameter, or a subterranean formation damage parameter.

10. The method as recited in claim 9, wherein the gravimetric noise parameter is determined using a gravitational numerical model.

11. The method as recited in claim 1, wherein the integration time interval is in a range of 1 second to 1,000 seconds.

12. The method as recited in claim 1, wherein a first set of the one or more surface quantum gravimeters are at respective fixed locations and a second set of the one or more surface quantum gravimeters are movable, wherein the collecting further comprises:
moving the second set of the one or more surface quantum gravimeters after the integration time interval to respective new locations and collecting additional gravitational data using the second set of the one or more surface quantum gravimeters for the integration time interval at a next collection time interval.

13. The method as recited in claim 1, wherein one or more downhole gravimeters are located downhole one or more of the one or more wellbores, and the processing uses gravitational data from the one or more downhole gravimeters.

14. The method as recited in claim 13, wherein the one or more of the one or more downhole gravimeters are downhole quantum gravimeters.

15. The method as recited in claim 13, wherein the one or more of the one or more downhole gravimeters are non-quantum gravimeters.

16. The method as recited in claim 13, wherein the one or more downhole gravimeters are at respective fixed locations within the one or more wellbores.

17. The method as recited in claim 13, wherein the one or more downhole gravimeters have lesser sensitivity than the one or more surface quantum gravimeters.

18. A system, comprising:
a set of quantum gravimeters positioned to collect gravitational data of a subterranean formation of a reservoir, wherein the reservoir has well sites for hydrocarbon extraction, the set of quantum gravimeters positioned to receive input parameters that specify one or more of an integration time interval or a collection time interval;
a data transceiver, capable of receiving the gravitational data from the set of quantum gravimeters; and
a gravitational processor, capable of communicating with the data transceiver and analyzing the gravitational data to generate analyzed gravitational parameters and one or more subterranean formation parameters.

19. The system as recited in claim 18, further comprising:
a result transceiver, capable of communicating the analyzed gravitational parameters, the subterranean formation parameters, and interim outputs, to a user system, a data store, or a computing system.

20. The system as recited in claim 19, wherein the computing system is one or more of a reservoir controller, a well site controller, or a non-quantum gravimeter.

21. The system as recited in claim 18, wherein the set of quantum gravimeters receive the input parameters that specify the collection time interval.

22. The system as recited in claim 18, wherein the set of quantum gravimeters receive the input parameters that specify the integration time interval.

23. The system as recited in claim 18, further comprising:
a set of non-quantum gravimeters, capable to collect a second set of gravitational data, and wherein the data transceiver is further capable of receiving the second set of gravitational data from the set of non-quantum gravimeters.

24. The system as recited in claim 23, wherein at least one of non-quantum gravimeters in the set of non-quantum gravimeters is calibrated utilizing the analyzed gravitational parameters or the subterranean formation parameters.

25. The system as recited in claim 23, wherein the set of non-quantum gravimeters are MEMs gravimeters.

26. The system as recited in claim 23, where at least one non-quantum gravimeter in the set of non-quantum gravimeters is located downhole a wellbore of the well sites.

27. The system as recited in claim 18, wherein at least one quantum gravimeter in the set of quantum gravimeters is at a fixed surface location.

28. The system as recited in claim 18, wherein at least one quantum gravimeter in the set of quantum gravimeters is mobile and is moved to a new location at a determined time.

29. The system as recited in claim 18, wherein at least one quantum gravimeter in the set of quantum gravimeters is located downhole a wellbore of the well sites.

30. The system as recited in claim 18, wherein the one or more subterranean formation parameters include at least one of a depth parameter, a direction parameter, a fluid movement parameter, a gravimetric noise parameter, or a subterranean formation damage parameter.

31. The system as recited in claim 18, further comprising:
a machine learning system, capable to communicate with the gravitational processor, and to process the gravitational data using one or more inversion algorithms.

32. The system as recited in claim 18, wherein each gravimeter in the set of quantum gravimeters uses rubidium atoms.

33. The system as recited in claim 18, wherein each gravimeter in the set of quantum gravimeters cools measuring atoms to less than 10 Kelvin.

34. A computer program product having a series of operating instructions stored on a non-transitory computer-readable medium that directs a data processing apparatus when executed thereby to perform operations to determine subterranean formation parameters and analyzed gravitational parameters, the operations comprising:
receiving collected gravitational data from one or more surface quantum gravimeters, wherein the one or more surface quantum gravimeters are located at a surface location proximate a well site of a reservoir, where the well site is for hydrocarbon production and has one or more wellbores, including receiving input parameters at one or more of the one or more surface quantum gravimeters, wherein the input parameters specify one or more of an integration time interval or a collection time interval;
processing the gravitational data received from the one or more surface quantum gravimeters, generating the analyzed gravitational parameters and the subterranean formation parameters that indicate fluid movement in a subterranean formation of the reservoir as a stage of a well site operation plan is executed; and
directing a modification the well site operation plan using the analyzed gravitational parameters and the subterranean formation parameters.

35. A method, comprising:
locating one or more surface quantum gravimeters at a surface location proximate a well site of a reservoir, where the well site is for moving fluids into or out of the reservoir and has one or more wellbores;
collecting gravitational data at the one or more surface quantum gravimeters;
locating one or more non-quantum gravimeters proximate the well site;
calibrating the one or more non-quantum gravimeters using the gravitational data received from the one or more surface quantum gravimeters; and
processing the gravitational data received from the one or more surface quantum gravimeters, generating analyzed gravitational parameters and subterranean formation parameters that indicate mass changes within a subterranean formation of the reservoir as a stage of a well site operation plan is executed.

36. A method, comprising:
locating one or more surface quantum gravimeters at a surface location proximate a well site of a reservoir, where the well site is for moving fluids into or out of the reservoir and has one or more wellbores;
collecting gravitational data at the one or more surface quantum gravimeters; and
processing the gravitational data received from the one or more surface quantum gravimeters, generating analyzed gravitational parameters and subterranean formation parameters that indicate mass changes within a subterranean formation of the reservoir as a stage of a well site operation plan is executed, wherein the processing determines one or more of a depth parameter of a subterranean fluid in the subterranean formation, a direction parameter to the subterranean fluid in the subterranean formation, a fluid movement parameter, a gravimetric noise parameter, or a subterranean formation damage parameter, and further wherein the gravimetric noise parameter is determined using a gravitational numerical model.

37. A system, comprising:
a set of quantum gravimeters positioned to collect gravitational data of a subterranean formation of a reservoir, wherein the reservoir has well sites for hydrocarbon extraction;
one or more non-quantum gravimeters positioned proximate the well site
a data transceiver, capable of receiving the gravitational data from the set of quantum gravimeters; and
a gravitational processor, capable of communicating with the data transceiver and analyzing the gravitational data to generate analyzed gravitational parameters and one or more subterranean formation parameters, the one or more non-quantum gravimeters configured to be calibrated using the gravitational data received from the set of quantum gravimeters.

38. A system, comprising:
a set of quantum gravimeters positioned to collect gravitational data of a subterranean formation of a reservoir, wherein the reservoir has well sites for hydrocarbon extraction;
a data transceiver, capable of receiving the gravitational data from the set of quantum gravimeters; and
a gravitational processor, capable of communicating with the data transceiver and analyzing the gravitational data to generate analyzed gravitational parameters and one or more subterranean formation parameters, including being capable of processing the gravitational data received from the one or more surface quantum gravimeters, generating analyzed gravitational parameters and subterranean formation parameters that indicate mass changes within a subterranean formation of the reservoir as a stage of a well site operation plan is executed, wherein the processing determines one or more of a depth parameter of a subterranean fluid in the subterranean formation, a direction parameter to the subterranean fluid in the subterranean formation, a fluid movement parameter, a gravimetric noise parameter, or a subterranean formation damage parameter, and further wherein the gravimetric noise parameter is determined using a gravitational numerical model.

* * * * *